(12) United States Patent
Chen

(10) Patent No.: US 11,747,631 B2
(45) Date of Patent: Sep. 5, 2023

(54) HEAD-MOUNTED FIXING DEVICE

(71) Applicant: E-LEAD ELECTRONIC CO., LTD., Changhua (TW)

(72) Inventor: Stephen Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 119 days.

(21) Appl. No.: 17/451,929

(22) Filed: Oct. 22, 2021

(65) Prior Publication Data

US 2023/0071032 A1    Mar. 9, 2023

(30) Foreign Application Priority Data

Sep. 8, 2021   (TW) .................................. 110210609

(51) Int. Cl.
  *G02B 27/01* (2006.01)
  *G02C 5/14* (2006.01)
  *G02C 5/22* (2006.01)

(52) U.S. Cl.
  CPC ........ *G02B 27/0176* (2013.01); *G02B 27/0172* (2013.01); *G02C 5/14* (2013.01); *G02C 5/22* (2013.01)

(58) Field of Classification Search
  CPC ... G02B 27/0176; G02B 27/0172; G02C 5/14; G02C 5/22
  USPC .................................. 359/630, 815; 345/7-9
  See application file for complete search history.

(56) References Cited

FOREIGN PATENT DOCUMENTS

| CN | 201060318 | Y | 5/2008 | |
| CN | 203057249 | U | 7/2013 | |
| CN | 203608282 | U | 5/2014 | |
| CN | 102692710 | B | 10/2014 | |
| JP | 3576985 | B2* | 10/2004 | ............. G06F 1/163 |
| TW | 298625 | B | 2/1997 | |
| TW | 1518369 | B | 1/2016 | |
| TW | 201608279 | A | 3/2016 | |
| TW | 1563361 | B | 12/2016 | |
| TW | M535811 | U | 1/2017 | |
| TW | M536362 | U | 2/2017 | |
| TW | M541404 | U | 5/2017 | |
| TW | M548275 | U | 9/2017 | |
| TW | M550572 | U | 10/2017 | |
| TW | 1654444 | B | 3/2019 | |
| TW | M592084 | U | 3/2020 | |

* cited by examiner

*Primary Examiner* — William Choi
(74) *Attorney, Agent, or Firm* — Wang Law Firm, Inc.

(57) ABSTRACT

A head-mounted fixing device includes a head frame, a bracket and a headband. Two side frame portions of the head frame abut against two sides of a user's head, and a front frame portion of the head frame is located between the two side frame portions and abuts against the user's forehead. The headband is movably connected to two first adjusting members of the head frame, so the position of the front frame portion on the forehead can be adjusted by adjusting positions of the two first adjusting members on the headband. The bracket abuts against the top of the head. The headband can wrap around and abut against the back of the head. The head frame, the bracket and the headband abut against the head to restrict the head-mounted fixing device from moving relative to the head, so that the head-mounted fixing device may be worn without shaking.

10 Claims, 9 Drawing Sheets

HEAD-MOUNTED FIXING DEVICE

BACKGROUND

Field of the Invention

The present invention relates to a fixing device, and more particularly to head-mounted fixing device.

Description of Related Art

Medicine has proven that long-term close viewing is the main cause of myopia. Basically, the longer the visual distance from the object side to the eyes, the more beneficial to eye health. However, when reading, writing, or watching the screen of a mobile electronic device (such as a mobile phone, a tablet computer), the longer the visual distance, the worse the visual recognition ability, which is likely to cause eye fatigue. Therefore, in order to maintain the ability of visual recognition while extending the visual distance, it is necessary to rely on the assistance of new technologies, such as the technology of projecting the virtual image of the object side to the eyes, for example, the technologies disclosed in patents TWM536362, CN102692710B, TWM550572, CN203608282U, TWI518369, CN203057249U, TWI563361, TW298625, TW201608279, CN201060318Y, TWM541404, TWM535811, TWM592084, and TWM548275, can even work in conjunction with a head-mounted fixing device.

Patents TWI654444 (shown in FIG. 1) and TWM536362 each disclosed a head-mounted fixing device. However, the designs of these fixing devices have the problem of unstable fixation.

SUMMARY

Therefore, the main objective of the present invention is to provide a head-mounted fixing device that can be worn stably.

To achieve the above objective, a head-mounted fixing device provided by an embodiment of the invention includes: a head frame including two side frame portions, a front frame portion located between the two side frame portions and connected to the two side frame portions, and two first adjusting members respectively provided on the two side frame portions, wherein the two side frame portions are configured to abut against two opposite sides of a user's head, the front frame portion is configured to abut against the user's forehead, and the side frame portions and the front frame portion are made of hard materials; a bracket including a first end connected to the front frame portion, and configured to abut against a top of the head; and a headband connected to a second end of the bracket and movably connected to the two first adjusting members, wherein the headband is configured to be wrapped around and abut against a back of the head, and the second end of the bracket is opposite to the first end; the two side frame portions, the front frame portion, the bracket and the headband abut against the head to restrict the head-mounted fixing device from moving relative to the head; and a position of each of the first adjusting members on the headband is adjusted to adjust a position of the front frame portion on the forehead.

In some embodiments, the head-mounted fixing device further includes: an extension frame connected to the head frame; a magnifying assembly connected to the extension frame and including a magnifier facing the user; and a reflective assembly connected to the extension frame, located between the magnifying assembly and the user, and including a reflector, wherein a back of the reflector faces the user and is configured to reflect object-side light from an object side to the magnifier, so that the object-side light is magnified by the magnifier, and then projected by the magnifier to the user's eyes.

In some embodiments, the reflector is a convex mirror, and the magnifier is a concave mirror.

In some embodiments, at least one of the magnifying assembly and the reflective assembly is pivotally connected to the extension frame, and a second rotating shaft is provided at each pivotal connection between the at least one of the magnifying assembly and the reflective assembly and the extension frame.

In some embodiments, the bracket includes at least one retractable structure, and a fitting degree between the head-mounted fixing device and the head is adjustable by expansion or contraction of the bracket.

In some embodiments, the first end of the bracket is pivotally connected to the front frame portion.

In some embodiments, a pad is provided on a surface of the front frame portion facing the head, and the pad is configured to abut against the forehead.

In some embodiments, the two side frame portions are pivotally connected to the front frame portion, and a first rotating shaft is provided at each pivotal connection between each of the two side frame portions and the front frame portion.

In some embodiments, the first adjusting members are snap-fits.

In some embodiments, the headband includes a second adjusting member for adjusting a length of the headband.

The head-mounted fixing device provided by this invention can limit the movement of the head-mounted fixing device relative to the head when the head frame, bracket and headband abut against the user's head, so that the user can stably wear the head-mounted fixing device. In addition, the front frame portion of the head frame and the two side frame portions located on the opposite sides of the front frame portion can nestle against the head, whereby the head-mounted fixing device can be worn more stably.

BRIEF DESCRIPTION OF THE DRAWINGS

After studying the detailed description in conjunction with the following drawings, other aspects and advantages of the present invention will be discovered.

DETAILED DESCRIPTION

Figure 1:
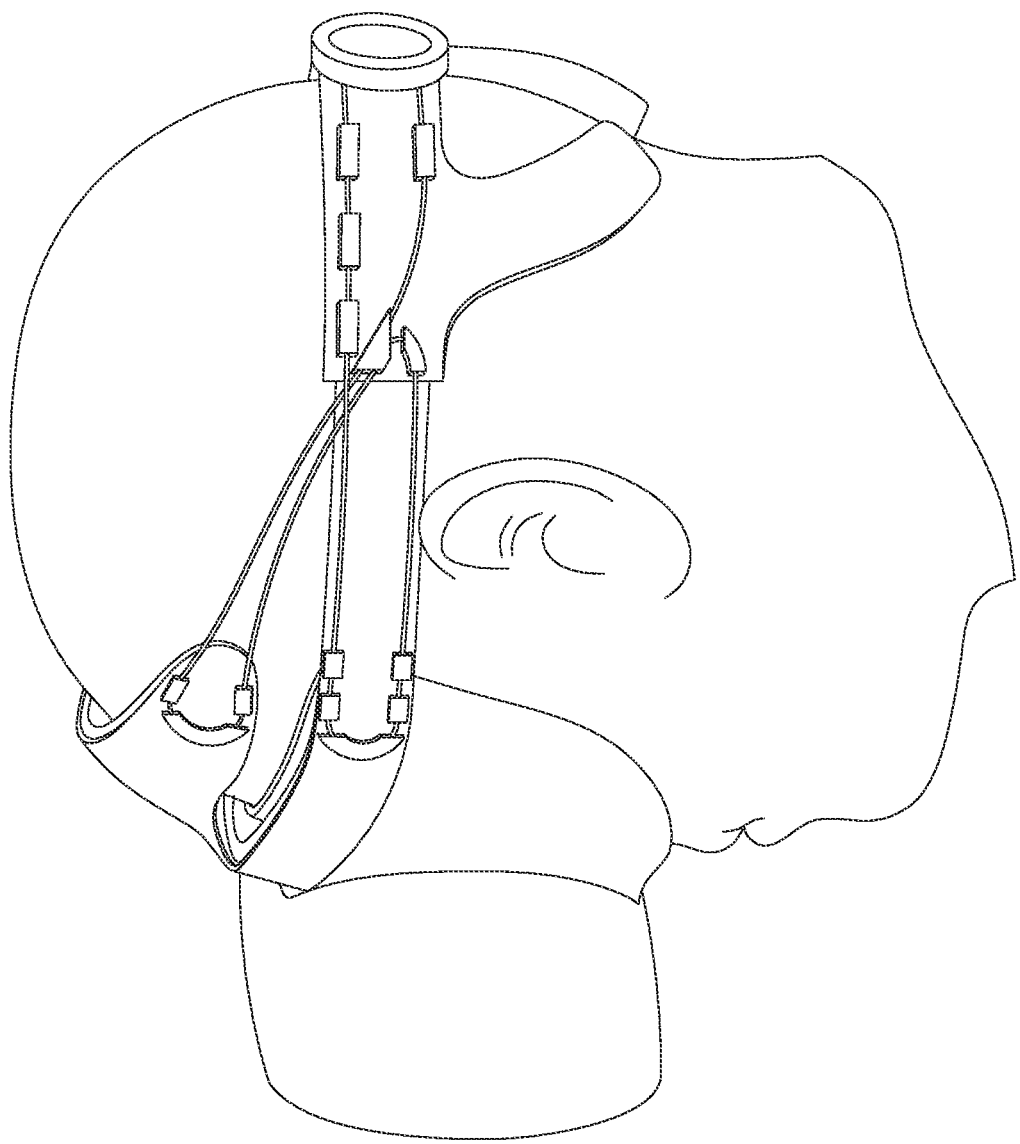
FIG. 1 is a schematic view of a conventional head-mounted fixing device applied to a head-mounted display device.

Please refer to FIGS. 2-8, the head-mounted fixing device 1 provided by an embodiment of the present invention is suitable for being worn on the head 2 of the user. The head-mounted fixing device 1 includes a head frame 10, a bracket 20, a headband 30, an extension frame 40, a magnifying assembly 50 and a reflective assembly 60.

Figure 3:
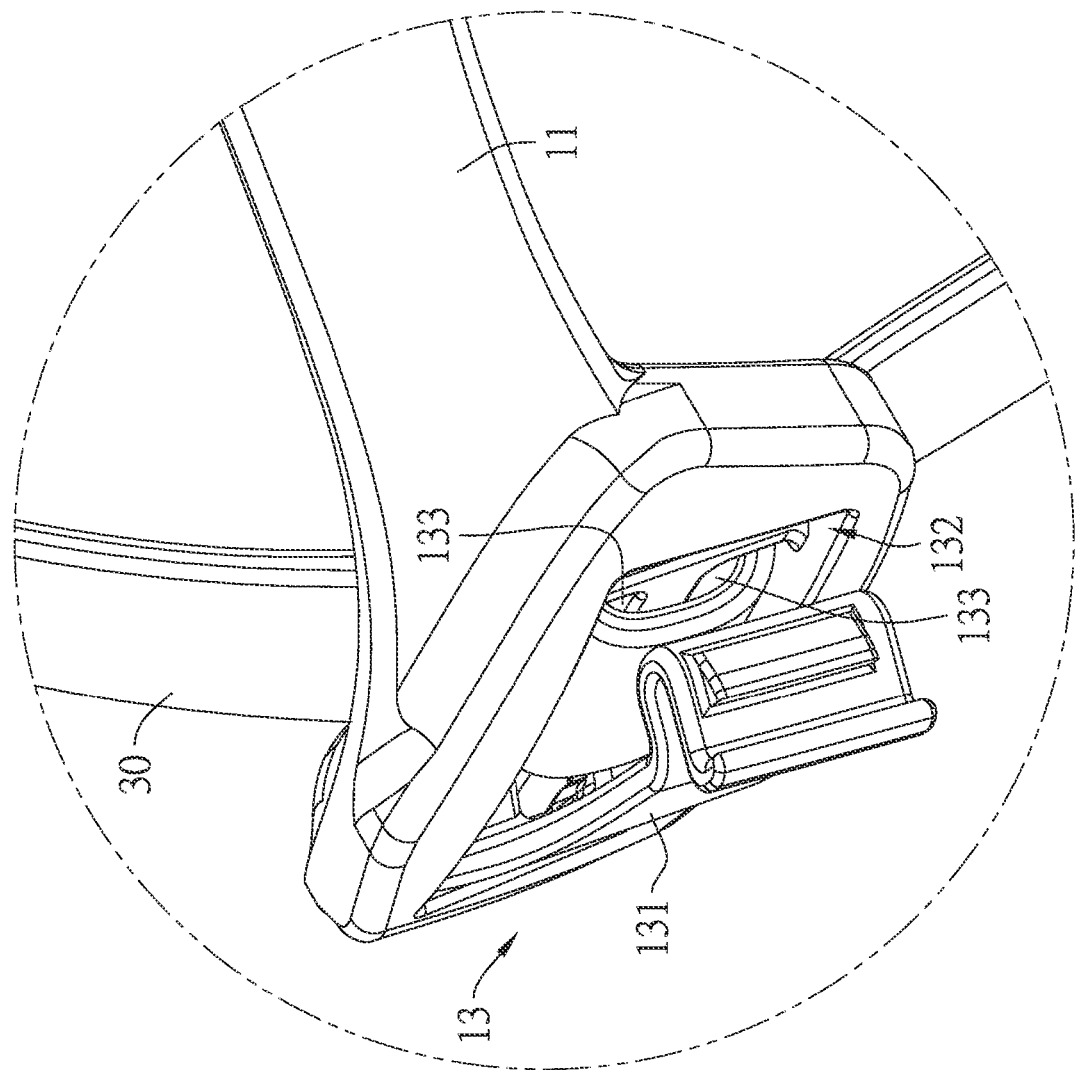
FIG. 3 is a magnified view of a part of a head-mounted fixing device according to an embodiment of the present invention, to show the structure of the first adjusting member.
Figure 4:
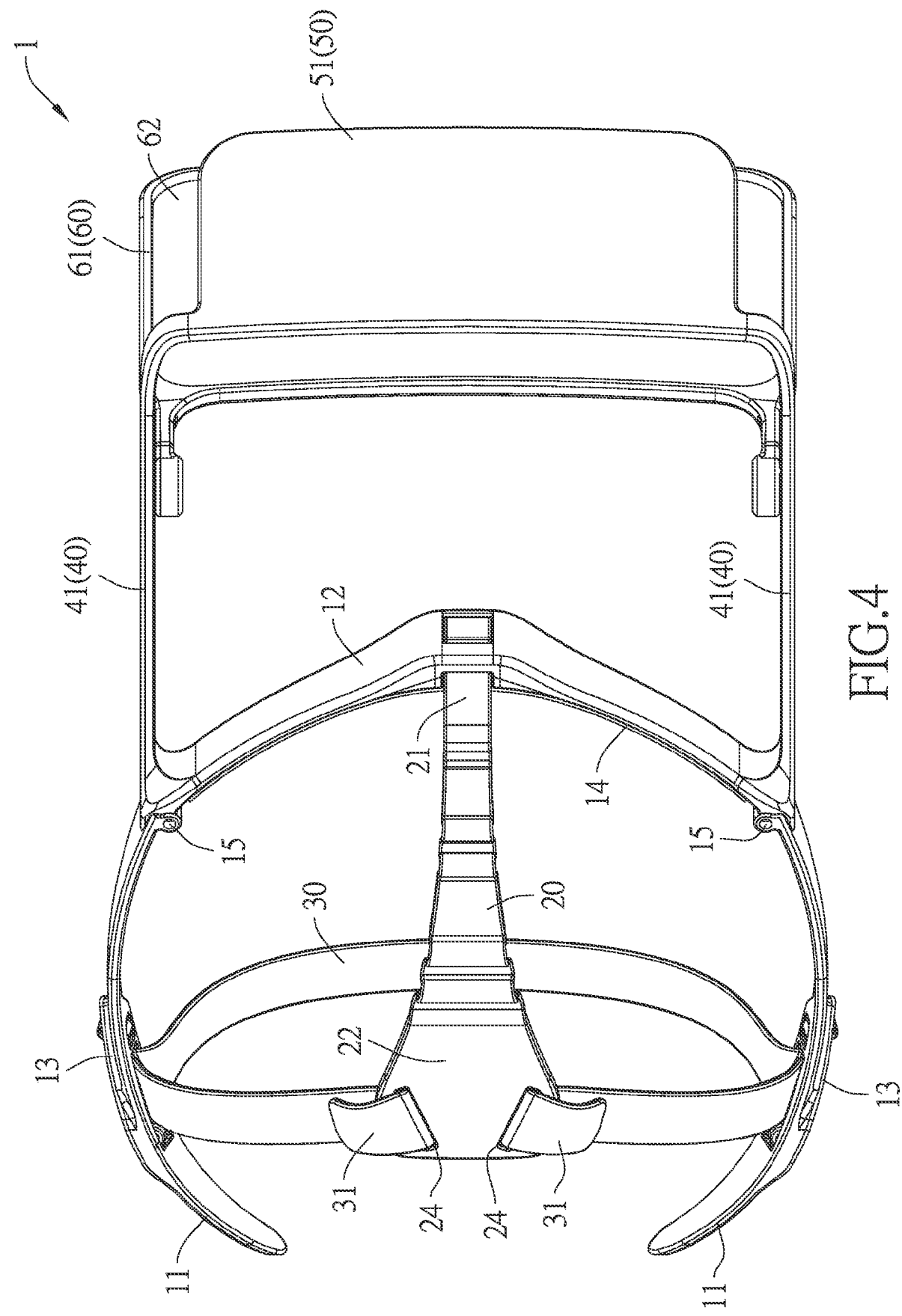
FIG. 4 is a top view of a head-mounted fixing device according to an embodiment of the present invention.
Figure 5:
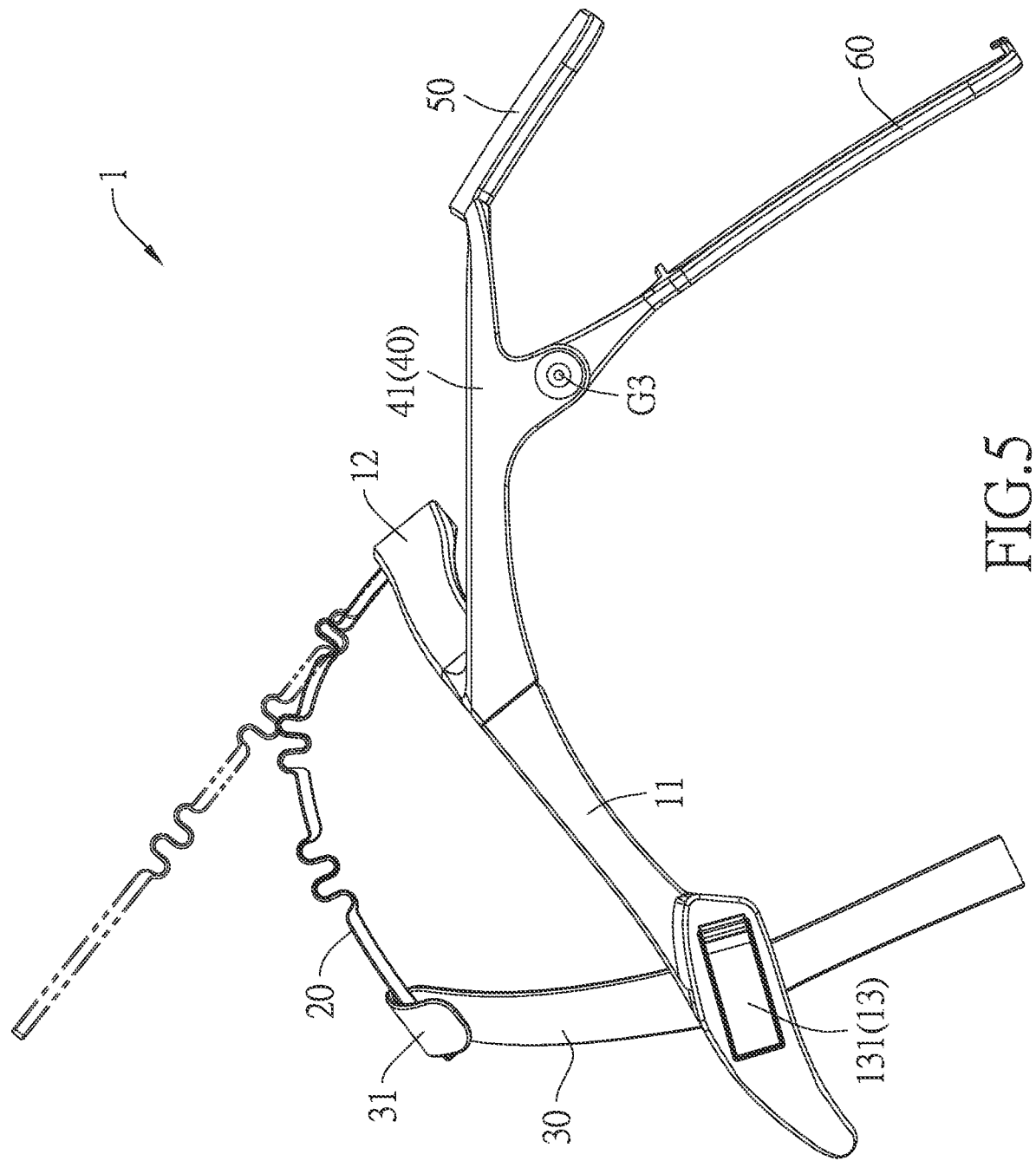
FIG. 5 is a side view of a head-mounted fixing device according to an embodiment of the present invention to show that the bracket is bendable.

The head frame 10 includes two side frame portions 11, a front frame portion 12 located between the two side frame portions 11, and two first adjusting members 13 respectively provided on the two side frame portions 11. In this embodiment, the two side frame portions 11 are pivotally connected to two opposite ends of the front frame portion 12 respectively. Specifically, a first rotating shaft 15 may be provided at each pivotal connection between the front end of each of the two side frame portions 11 and the front frame portion 12; however, the present invention is not limited to this pivotal connection manner. Therefore, the two side frame portions 11 can be folded when not in use. In other embodiments, the two side frame portions 11 and the front frame portion 12 may also be integrally formed. The two side frame portions 11 are used to abut against two opposite sides of the head 2, and the front frame portion 12 is configured to abut against the user's forehead. The side frame portions 11 and the front frame portion 12 are made of hard materials, such as but not limited to plastic. The first adjusting members 13 may be, for example, but not limited to, snap-fits, as shown in FIG. 3, and each of the first adjusting members 13 includes an engaging cover 131, an engaging hole 132 and two insertion holes 133. The engaging cover 131 can be inserted into the engaging hole 132. The two insertion holes 133 can be configured for the headband 30 to pass therethrough. In this embodiment or other embodiments, a pad 14 is provided on a surface of the front frame portion 12 facing the head 2, and the pad 14 is configured to nestle up against the forehead to improve wearing comfort.

The bracket 20 includes a first end 21, a second end 22 opposite to the first end 21, and at least one retractable structure 23 located between the first end 21 and the second end 22. The first end 21 of the bracket 20 is pivotally connected to the front frame portion 12. The second end 22 of the bracket 20 includes two through holes 24 for the headband 30 to pass through. The retractable structure 23 can be, for example, but not limited to, a wave structure and made of elastic material, so it can be elongated, compressed and bent.

Figure 6:
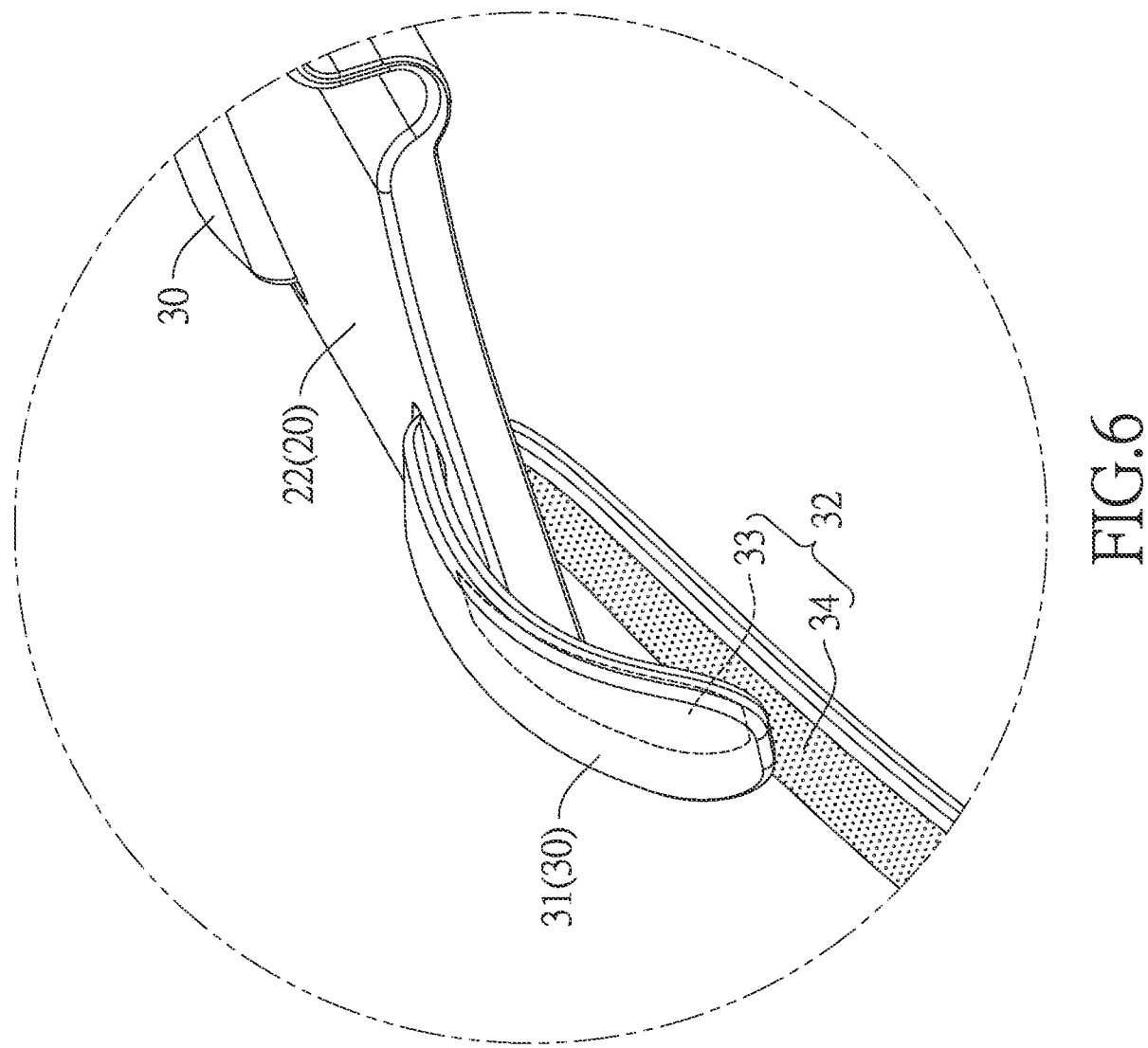
FIG. 6 is a magnified view of a part of a head-mounted fixing device according to an embodiment of the present invention, to show the structure of a second adjusting member on the headband.
Figure 7:
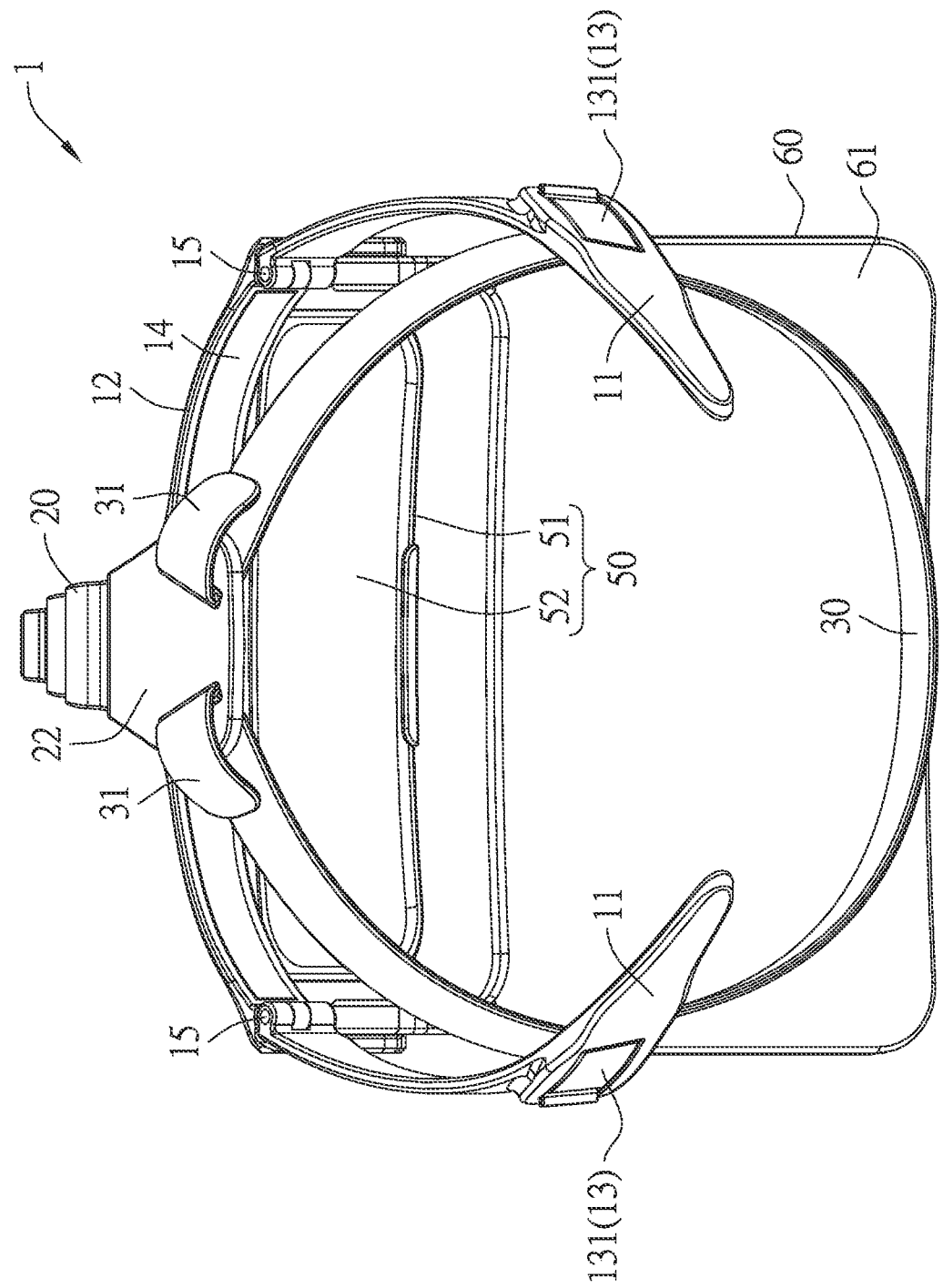
FIG. 7 is a rear view of a head-mounted fixing device according to an embodiment of the present invention.

The headband 30 may be, for example, but not limited to, made of fabric or elastic material. The headband 30 is provided with a second adjusting member 32. The second adjusting member 32 may be, for example, but not limited to, hook and loop fastener(s). Taking the hook and loop fastener as an example, the second adjusting member 32 may include at least one first engaging member 33 and at least one second engaging member 34, and the first engaging member 33 is detachably engaged with the second engaging member 34. In this embodiment, as shown in FIG. 6, the second adjusting member 32 includes two first engaging members 33 respectively disposed at two opposite ends 31 of the headband 30, and includes a second engaging member 34 located between the two opposite ends 31. The first engaging members 33 and the second engaging member 34 are located on the same surface of the headband 30. However, this invention is not limited to the above embodiment.

The extension frame 40 is connected to the head frame 10 and extends from the head frame 10 in a direction away from the user. For example, the extension frame 40 includes two arms 41 located at two opposite ends of the front frame portion 12. A first end of one arm 41 is, for example, connected to the junction between one end of the front frame portion 12 and one side frame portion 11, and a first end of the other arm 41 is, for example, connected to the junction between the opposite end of the front frame portion 12 and the other side frame portion 11. However, this invention is not limited to the above examples. Moreover, in this embodiment, the front frame portion 12 and the extension frame 40 are integrally formed; and in other embodiments, the extension frame 40 can also be pivotally connected to the front frame portion 12 instead.

Figure 9:
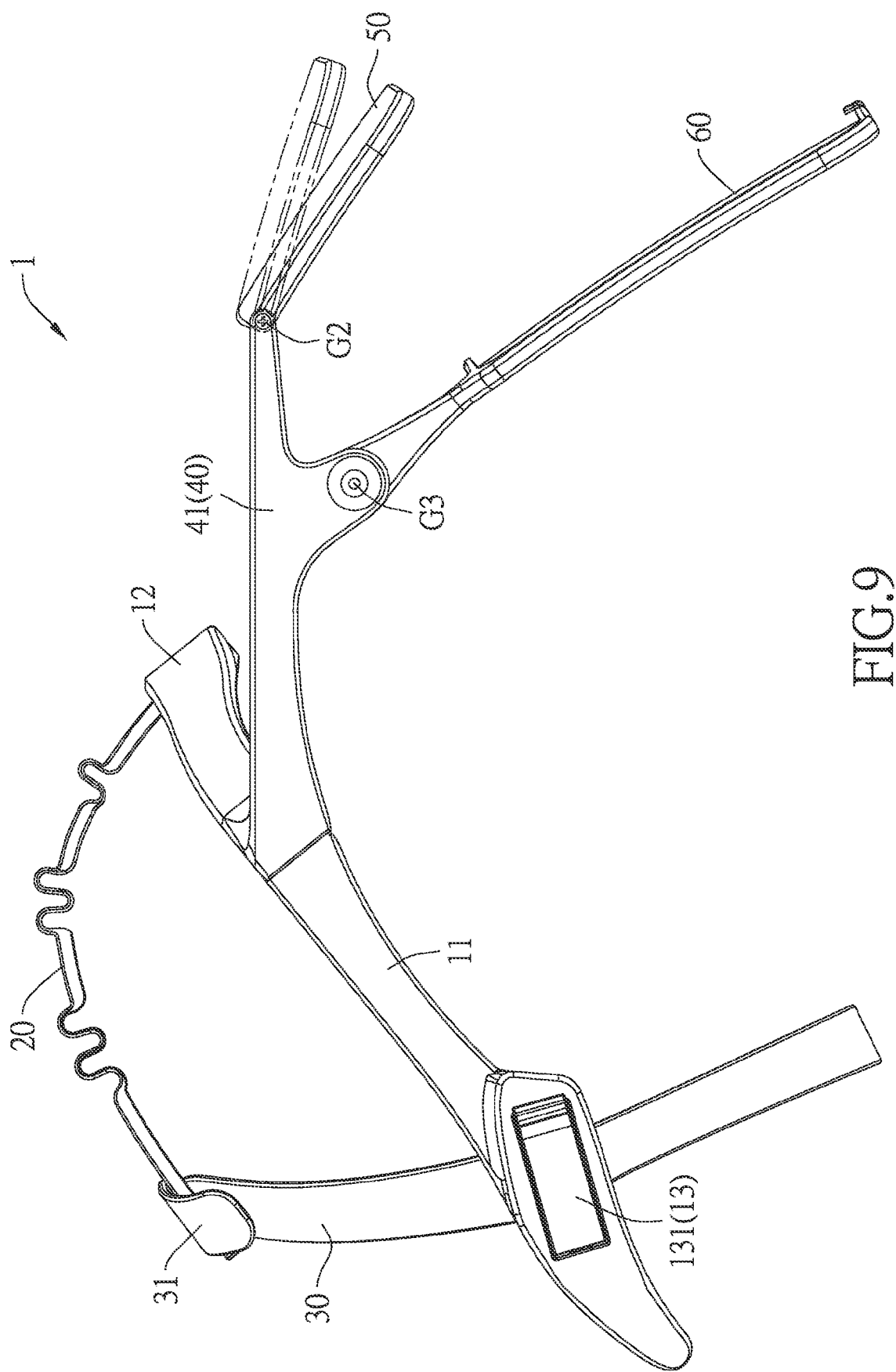
FIG. 9 is a side view of a head-mounted fixing device according to another embodiment of the present invention to show that the magnifying assembly can pivot relative to the extension frame.

The magnifying assembly 50 includes a first support 51 and a magnifier 52. The first support 51 is connected to second ends of the two arms 41 of the extension frame 40 opposite to the first ends of the two arms 41. The magnifier 52 is disposed on the first support 51 and faces the user. The magnifier 52 can be, for example, but not limited to, a concave mirror. In this embodiment, the extension frame 40 and the first support 51 are integrally formed; and in another embodiment, the first support 51 can be pivotally connected to the two arms 41 instead, as shown in FIG. 9, a second rotating shaft G2 is provided at each pivotal connection between the first support 51 and each of the two arms 41, so that the inclination angle of the magnifying assembly 50 can be adjusted. However, this invention is not limited to this pivotal connection manner.

Figure 2:
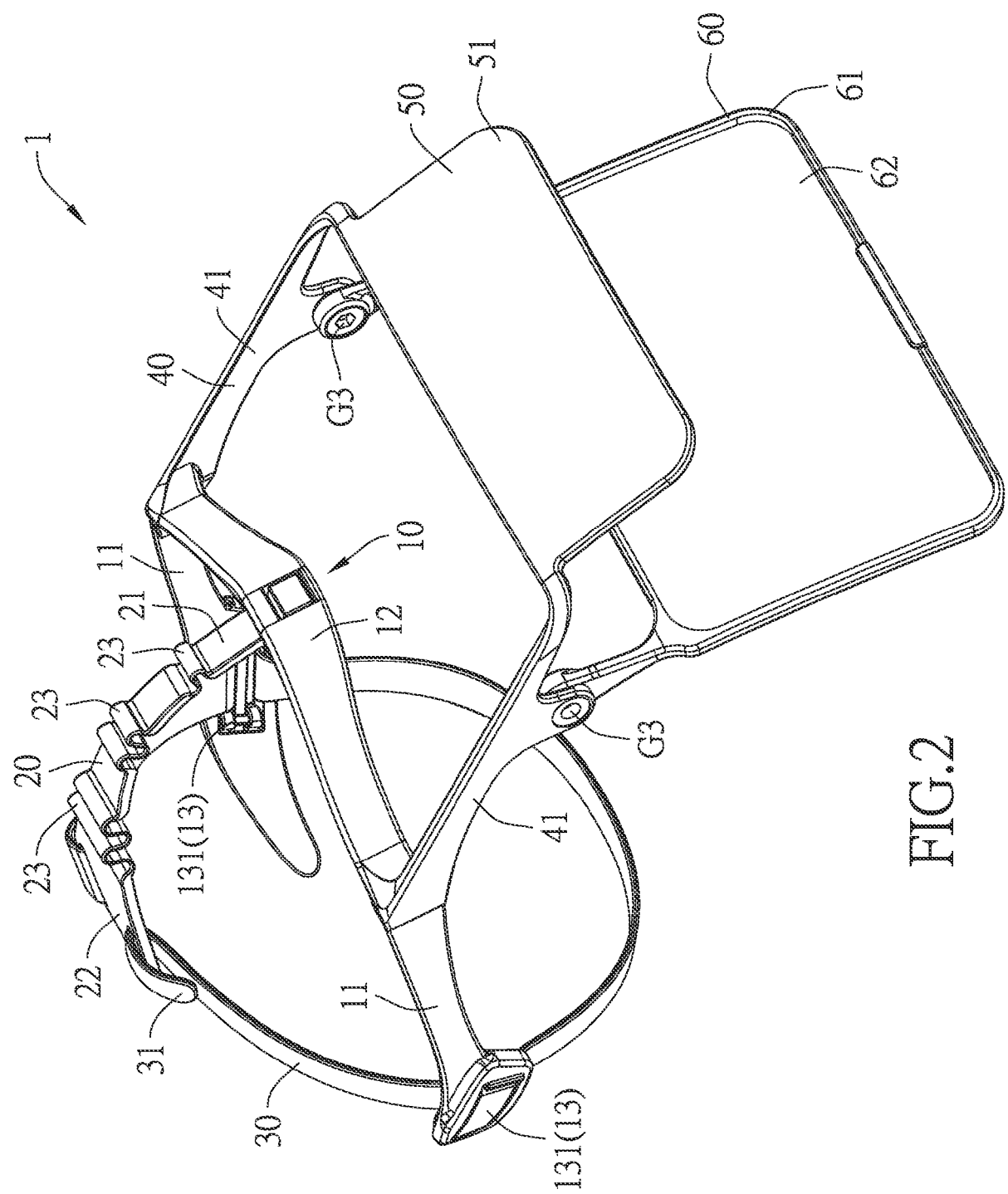
FIG. 2 is a schematic view of a head-mounted fixing device according to an embodiment of the present invention.
Figure 8:
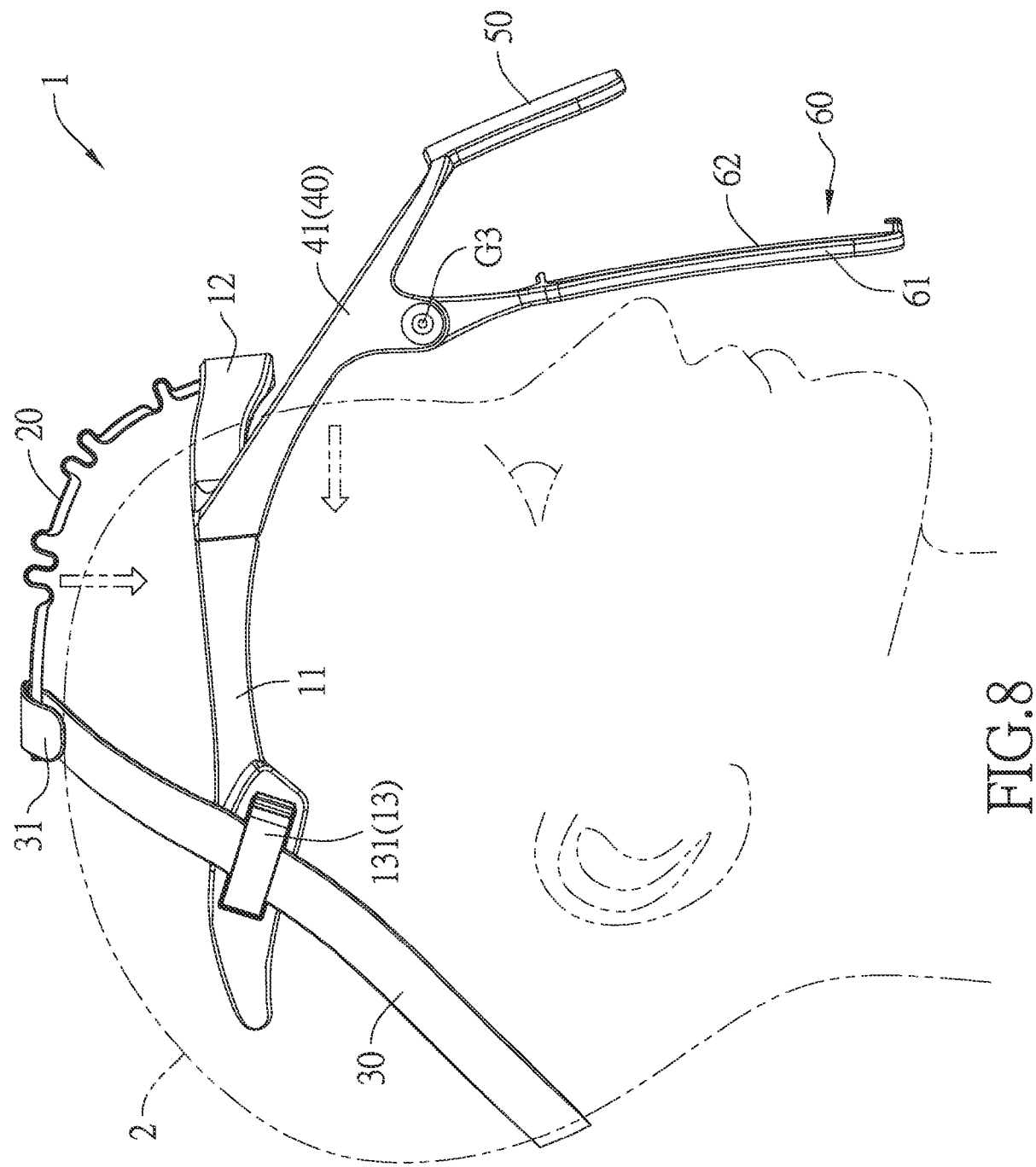
FIG. 8 is a schematic view of a user wearing a head-mounted fixing device according to an embodiment of the present invention.

The reflective assembly 60 includes a second support 61 and a reflector 62. The second support 61 is pivotally connected to two opposite positions on the two arms 41 of the extension frame 40 so that the reflective assembly 60 is located between the magnifying assembly 50 and the user. Specifically, as shown in FIGS. 2 and 8, a second rotating shaft G3 is provided at each pivotal connection between the second support 61 and each arm 41, so that the inclination angle of the reflective assembly 60 can be adjusted. However, this invention is not limited to this pivotal connection manner. The back of reflector 62 faces the user. The reflector 62 can be, for example, but not limited to, a convex mirror.

To wear the head-mounted fixing device 1, the opposite ends 31 of the headband 30 can be inserted through the insertion holes 133 of the two first adjusting members 13 of the head frame 10 respectively, and then respectively inserted through the two through holes 24 of the bracket 20, as shown in FIGS. 2 to 7. Next, as shown in FIG. 8, the front frame portion 12 can be nestled against the forehead to provide a first contact point; the two side frame portions 11 can be nestled against the opposite sides of the head 2 to provide two second contact points; the headband 30 can wrap around and abut against the back of the head 2 to provide a third contact point; and the bracket 20 is bend to nestled up against the top of the head to provide a fourth contact point. Then, the angle of each side frame portion 11 relative to the front frame portion 12 can be adjusted to adjust the fitting degree between the head frame 10 and the head 2; the positions of the first adjusting members 13 on the headband 30 can be adjusted to adjust the position of the headband 30 abutting against the back of the head and the position of the front frame portion 12 on the forehead; and the position of the through holes 24 of the second end 22 of the bracket 20 on the headband 30 can be adjusted to adjust the fitting degree of the bracket 20 relative to the top of the head. After that, the engaging cover 131 of each first adjusting member 13 can be snapped into the corresponding engaging hole 132 to restrict the movement of the first adjusting members 13 relative to the headband 30; each of the first engaging members 33 is engaged with the corresponding one of the second engaging member 34 to determine the length of the headband 30 when in use and restrict the movement of the bracket 20. In this way, the first to fourth contact points between the head-mounted fixing device 1 and the head 2 can restrict the head-mounted fixing device 1 from moving relative to the head 2 without shaking.

When the user wears the head-mounted fixing device 1 shown in FIG. 9 to read, write or watch the screen of the mobile electronic device, he/she can adjust the angle of the reflective assembly 60 relative to the arms 41 or rotate the third rotating shafts G3 to adjust the inclination angle of the reflective assembly 60 so that the object side (i.e., a book or the screen of a mobile electronic device) falls within the incident range of the reflector 62 (i.e., the range covered by the incident angle of the light), and adjusting the angle of the magnifying assembly 50 relative to the arms 41 or rotating the second rotating shaft G2 can be done to adjust the inclination angle of the magnifying assembly 50 so that the magnifier 52 falls within the reflection range of the reflector 62 (that is, the range covered by the reflection angle of the light). In this way, the reflector 62 can reflect the object-side light from the object side to the magnifier 52. Since the magnifier 52 faces the user, the object-side light magnified by the magnifier 52 can be projected by the magnifier 52 to the eyes of the user. At this time, the user can see the picture(s) and text(s) on the book or the screen through the magnifier 52, and the picture size and letter size on the magnifier 52 are greater than or equal to those on the book or the screen. In this way, the damage to the eyes caused by long-term close viewing may be reduced or avoided.

Although this invention is disclosed above with the foregoing embodiments, these embodiments are not intended to limit the invention. Without departing from the spirit and scope of this invention, all changes, modifications, and combinations of implementation patterns are within the scope of patent protection of this invention. For the scope of protection defined by this invention, please refer to the attached scope of claims

What is claimed is:

1. A head-mounted fixing device comprising:
    a head frame including two side frame portions, a front frame portion located between the two side frame portions and connected to the two side frame portions, and two first adjusting members respectively provided on the two side frame portions, wherein the two side frame portions are configured to abut against two opposite sides of a user's head, the front frame portion is configured to abut against the user's forehead, and the side frame portions and the front frame portion are made of hard materials;
    a bracket including a first end connected to the front frame portion, and configured to abut against a top of the head; and
    a headband connected to a second end of the bracket and movably connected to the two first adjusting members, wherein the headband is configured to be wrapped around and abut against a back of the head, and the first end and the second end of the bracket are opposite to each other;
    the two side frame portions, the front frame portion, the bracket and the headband abut against the head to restrict the head-mounted fixing device from moving relative to the head; and
    a position of each of the first adjusting members on the headband is adjusted to adjust a position of the front frame portion on the forehead.

2. The head-mounted fixing device as claimed in claim 1 further comprising:
    an extension frame connected to the head frame;
    a magnifying assembly connected to the extension frame and including a magnifier facing the user; and
    a reflective assembly connected to the extension frame, located between the magnifying assembly and the user, and including a reflector, wherein a back of the reflector faces the user and is configured to reflect object-side light from an object side to the magnifier, so that the object-side light is magnified by the magnifier, and then projected by the magnifier to the user's eyes.

3. The head-mounted fixing device as claimed in claim 2, wherein the reflector is a convex mirror, and the magnifier is a concave mirror.

4. The head-mounted fixing device as claimed in claim 2, wherein at least one of the magnifying assembly and the reflective assembly is pivotally connected to the extension frame, and a second rotating shaft is provided at each pivotal connection between the at least one of the magnifying assembly and the reflective assembly and the extension frame.

5. The head-mounted fixing device as claimed in claim 1, wherein the bracket includes at least one retractable structure, and a fitting degree between the head-mounted fixing device and the head is adjustable by expansion or contraction of the bracket.

6. The head-mounted fixing device as claimed in claim 1, wherein the first end of the bracket is pivotally connected to the front frame portion.

7. The head-mounted fixing device as claimed in claim 1, wherein a pad is provided on a surface of the front frame portion facing the head, and the pad is configured to abut against the forehead.

8. The head-mounted fixing device as claimed in claim 1, wherein the two side frame portions are pivotally connected to the front frame portion, and a first rotating shaft is provided at each pivotal connection between each of the two side frame portions and the front frame portion.

9. The head-mounted fixing device as claimed in claim 1, wherein the first adjusting members are snap-fits.

10. The head-mounted fixing device as claimed in claim 1, wherein the headband includes a second adjusting member for adjusting a length of the headband.

* * * * *